(12) United States Patent
Nodera

(10) Patent No.: US 6,727,312 B1
(45) Date of Patent: Apr. 27, 2004

(54) POLYCARBONATE RESIN COMPOSITION

(75) Inventor: Akio Nodera, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 10/030,184

(22) PCT Filed: Jul. 14, 2000

(86) PCT No.: PCT/JP00/04749

§ 371 (c)(1), (2), (4) Date: Feb. 1, 2002

(87) PCT Pub. No.: WO01/10956

PCT Pub. Date: Feb. 15, 2001

(30) Foreign Application Priority Data

Aug. 4, 1999 (JP) .......................................... 11/220919

(51) Int. Cl.⁷ ............................ C08L 69/00; C08L 67/02
(52) U.S. Cl. ................... 524/451; 525/92 A; 525/92 E; 525/101; 525/439; 525/464
(58) Field of Search ............................ 525/92 A, 92 E, 525/101, 439, 464, 451

(56) References Cited

U.S. PATENT DOCUMENTS

| | | | |
|---|---|---|---|
| 3,856,736 A | * | 12/1974 | Tieszen |
| 4,767,818 A | * | 8/1988 | Boutni |
| 5,508,344 A | * | 4/1996 | Mason |
| 5,981,661 A | * | 11/1999 | Liao |

FOREIGN PATENT DOCUMENTS

| | | | |
|---|---|---|---|
| EP | 105388 | * | 4/1984 |
| EP | 0 524 730 | | 1/1993 |
| EP | 692522 | | 1/1996 |
| EP | 0 899 306 | | 3/1999 |
| EP | 902060 | | 3/1999 |
| JP | 59-176345 | | 10/1984 |
| JP | 8-239565 | | 9/1996 |
| JP | 11-181268 | | 7/1999 |
| JP | 11-199767 | | 7/1999 |

OTHER PUBLICATIONS

Derwent Abstracts, AN 1999–439713, XP–002216681, JP 11–181265, Jul. 6, 1999.

Derwent Abstracts, AN 2000–102246, XP–002222651, JP 11–343400, Dec. 14, 1999.

* cited by examiner

Primary Examiner—David J. Buttner
(74) Attorney, Agent, or Firm—Oblon, Spivak, McClelland, Maier & Neustadt, P.C.

(57) ABSTRACT

For making a polycarbonate resin resistant to flames with any of non-halogen and non-phosphorus compounds, provided is a polycarbonate resin composition having good flame retardancy and having good impact resistance, high stiffness and good chemical resistance. The flame-retardant polycarbonate resin composition comprises a resin mixture of (A) from 1 to 99% by weight of a polycarbonate and (B) from 1 to 99% by weight of a thermoplastic polyester, and contains, relative to 100 parts by weight of the resin mixture, (C) from 0.01 to 3 parts by weight of a polyfluoro-olefin resin, and (D) from 1 to 400 parts by weight of a polycarbonate-polyorganosiloxane copolymer and/or (E) from 0.1 to 10 parts by weight of a functional silicone compound.

20 Claims, 1 Drawing Sheet

POLYCARBONATE RESIN COMPOSITION

TECHNICAL FIELD

The present invention relates to a polycarbonate resin composition, more precisely, to a polycarbonate resin composition not containing halogen and phosphorus but containing a minor additive to exhibit good flame retardancy and have good impact resistance, high stiffness, good melt flowability and good chemical resistance.

BACKGROUND ART

As having the advantages of impact resistance, heat resistance and good electric properties, polycarbonate resins have many applications in various fields of, for example, OA (office automation) appliances, information and communication appliances, other electric and electronic appliances for industrial use and household use, automobile parts and building materials. As a rule, polycarbonate resins are self-extinguishable. However, some fields of typically OA appliances, information and communication appliances, and other electric and electronic appliances for industrial use and household use require high flame retardancy, for which are used various flame retardants to improve their flame retardancy.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living with polycarbonate resin products and toward environmental protection from discarded and incinerated wastes of the products, the market requires flame retardation of polycarbonate resins with non-halogen flame retardants. Given that situation, polycarbonate resin compositions with phosphorus-containing organic flame retardants, especially organic phosphate compounds that are non-halogen flame retardants have been proposed, and their flame retardancy is good. Such phosphorus-containing organic flame retardants serve also as a plasticizer, and various methods of using them for making polycarbonate resins resistant to flames have been proposed.

However, in order to make polycarbonate resins have good flame retardancy by adding thereto an organic phosphate compound, a relatively large amount of the compound must be added to the resins. In general, polycarbonate resins require relatively high molding temperatures, and their melt viscosity is high. Therefore, for molding them into thin-walled and large-sized moldings, the molding temperature will have to be more higher. For these reasons, organic phosphate compounds often cause some problems when added to such polycarbonate resins, though their flame-retarding ability is good. For example, organic phosphate compounds often corrode molds used for molding resins containing them, and generate gas to have some unfavorable influences on the working environments and even on the appearance of the moldings. Another problem with organic phosphate compounds is that, when the moldings containing them are left under heat or in high-temperature and high-humidity conditions, the compounds lower the impact strength of the moldings and yellow the moldings. In addition, polycarbonate resin compositions containing organic phosphate compounds are not stable under heat, and therefore do not meet the recent requirement for recycling resin products. This is still another problem with organic phosphate compounds.

On the other hand, for machine parts which will be often stained with oil or copying ink having scattered therearound and for products that will be coated with grease or the like, resin materials are further required to have good chemical resistance in addition to flame retardancy.

To meet the market requirements, proposed is another technique of adding silicone compounds to polycarbonate resins to make the resins have flame retardancy. In this, silicone compounds added to the resins do not give toxic gas when fired. For example, (1) Japanese Patent Laid-Open No. 139964/1998 discloses a flame retardant that comprises a silicone resin having a specific structure and a specific molecular weight.

(2) Japanese Patent Laid-Open Nos. 45160/1976, 318069/1989, 306265/1994, 12868/1996, 295796/1996, and Japanese Patent Publication No. 48947/1991 disclose silicone-containing, flame-retardant polycarbonate resin compositions. The flame retardancy level of the products in (1) is high in some degree, but the impact resistance thereof is often low. The technology of (2) differs from that of (1) in that the silicones used in (2) do not act as a flame retardant by themselves, but are for improving the dripping resistance of resins, and some examples of silicones for that purpose are mentioned. Anyhow, in (2), the resins indispensably require an additional flame retardant of, for example, organic phosphate compounds or metal salts of Group 2 of the Periodic Table. Another problem with the flame-retardant polycarbonate resin compositions in (2) is that the flame retardant added thereto worsens the moldability and even the physical properties of the resin compositions and their moldings.

Also known is a flame-retardant polycarbonate resin composition that comprises a polycarbonate resin, a polycarbonate-polyorganosiloxane copolymer-containing resin and a fibril-forming polytetrafluoroethylene (Japanese Patent Laid-Open No. 81620/1996). Even though its polyorganosiloxane content is low, falling within a defined range, the composition exhibits good flame retardancy. Though its flame retardancy is good, however, the composition is problematic in that its impact resistance intrinsic to polycarbonate resins is often low.

For improving the chemical resistance of polycarbonate resins, it is generally known to add a thermoplastic polyester to the resins. For example, Japanese Patent Laid-Open No. 181265/1999 discloses a polycarbonate resin composition prepared by adding a polyester resin, an alkali metal or alkaline earth metal perfluoroalkanesulfonate, a fluororesin and a silicone, to a polycarbonate resin. However, since its high-temperature thermal stability in dwell time in an extruder or the like is often poor, the resin composition is difficult to recycle.

The present invention has been made in the current situation as above, and its object is to provide a non-halogen and non-phosphorus, flame-retardant polycarbonate resin composition of which the flame retardancy is good and which has good impact resistance, high stiffness, good melt flowability and good chemical resistance.

DISCLOSURE OF THE INVENTION

I, the present inventor have assiduously studied, and, as a result, have found that, when a thermoplastic polyester, a polyfluoro-olefin resin, and a polycarbonate-polyorganosiloxane copolymer and/or a specific silicone compound are added to a polycarbonate resin, then the above-mentioned object of the invention can be effectively attained. On the basis of this finding, we have completed the present invention.

Specifically, the invention is summarized as follows:

1. A polycarbonate resin composition which comprises a resin mixture of (A) from 1 to 99% by weight of a polycarbonate and (B) from 1 to 99% by weight of a thermoplastic polyester, and contains, relative to 100 parts by weight of the resin mixture, (C) from 0.01 to 3 parts by weight of a polyfluoro-olefin resin, and (D) from 1 to 400 parts by weight of a polycarbonate-polyorganosiloxane copolymer and/or (E) from 0.1 to 10 parts by weight of a functional silicone compound, and of which the silicone content derived from the component (D) and/or the component (E) falls between 0.5 and 10% by weight of the composition.

2. The polycarbonate resin composition of above 1, which further contains (F) from 1 to 50 parts by weight of an inorganic filler.

3. The polycarbonate resin composition of above 1 or 2, wherein the functional silicone compound for the component (E) has a basic structure of a general formula (1):

wherein $R^1$ indicates a functional group, $R^2$ indicates a hydrocarbon residue having from 1 to 12 carbon atoms, and a and b are numbers satisfying the relations of $0<a\leq3$, $0\leq b<3$, and $0<a+b\leq3$.

4. The polycarbonate resin composition of any of above 1 to 3, wherein the functional group in the functional silicone compound for the component (E) is selected from an alkoxy group, a vinyl group, a hydrogen residue and an epoxy group.

5. The polycarbonate resin composition of any of above 1 to 4, wherein the functional group in the functional silicone compound for the component (E) is a methoxy group or a vinyl group.

6. The polycarbonate resin composition of any of above 1 to 5, wherein the polyfluoro-olefin resin for the component (C) is a fibril-forming polytetrafluoroethylene having a mean molecular weight of at least 500,000.

7. The polycarbonate resin composition of any of above 1 to 6, wherein the polycarbonate for the component (A) has a viscosity-average molecular weight of from 15,000 to 20,000.

8. The polycarbonate resin composition of any of above 2 to 7, wherein the inorganic filler for the component (F) is talc having a mean particle size of from 0.2 to 20 μm.

9. Housings or parts of electric and electronic appliances, which comprise the polycarbonate resin composition of any of above 1 to 8.

BEST MODES OF CARRYING OUT THE INVENTION

Figure 1:
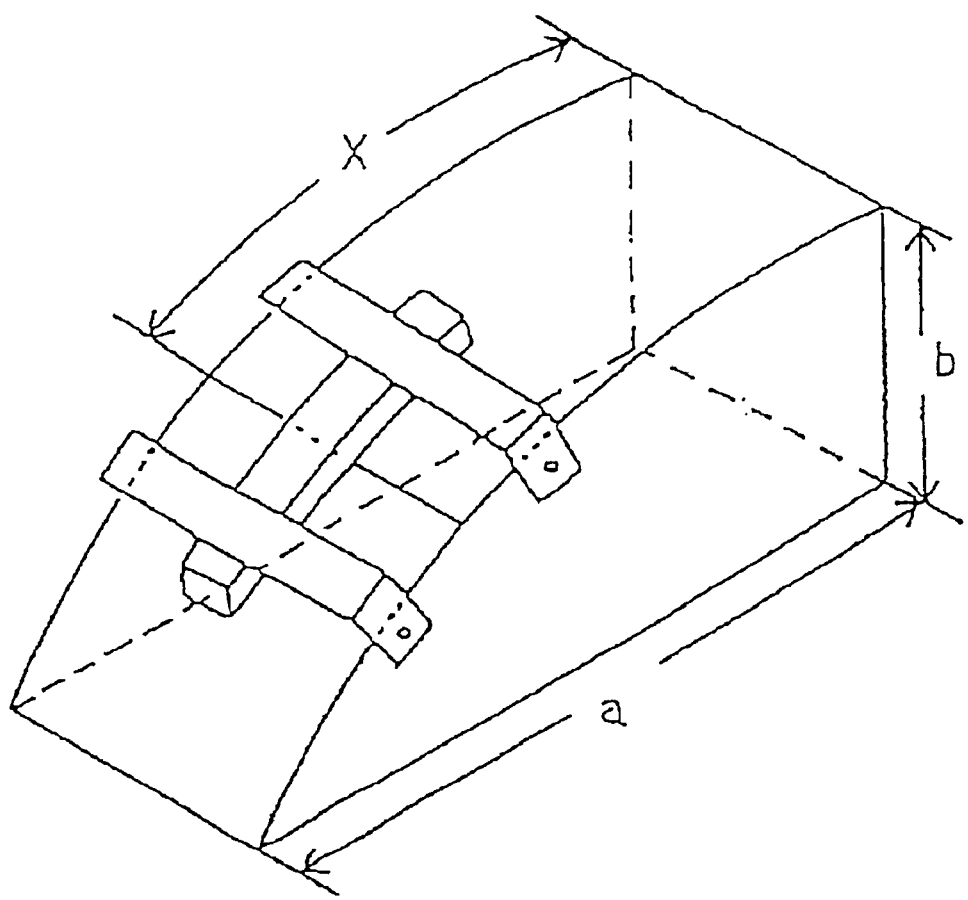
FIG. 1 is a perspective view of a tool for holding a test piece thereon for evaluating the grease resistance of the polycarbonate resin composition of the invention.

The invention is described in detail hereinunder.

(A) Polycarbonate:

The polycarbonate (PC) for the component (A) in the polycarbonate resin composition of the invention is not specifically defined, and may be any and every one known in the art. Generally used herein are aromatic polycarbonates to be produced through reaction of diphenols and carbonate precursors. For example, herein used are polycarbonates produced by reacting a diphenol and a carbonate precursor in a solution method or in a melt method, such as those produced through reaction of a diphenol and phosgene or through interesterification of a diphenol and a diphenyl carbonate.

Various diphenols are usable, typically including 2,2-bis (4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis (4-hydroxyphenyl) oxide, bis(4-hydroxyphenyl) sulfide, bis (4-hydroxyphenyl) sulfone, bis(4-hydroxyphenyl) sulfoxide, bis (4-hydroxyphenyl) ether, and bis (4-hydroxyphenyl) ketone.

For the diphenols for use herein, especially preferred are bis(hydroxyphenyl)alkanes, more preferably, those consisting essentially of bisphenol A. Other examples of diphenols usable herein are hydroquinone, resorcinol and catechol. The diphenols mentioned herein may be used either singly or as combined.

The carbonate precursors for use in the invention include, for example, carbonyl halides, carbonyl esters, and haloformates, concretely, phosgene, dihaloformates of diphenol, diphenyl carbonate, dimethyl carbonate, and diethyl carbonate.

The polycarbonate resin for the component (A) may have a branched structure, for which the branching agent includes, for example, 1,1,1-tris(4-hydroxyphenyl)ethane, α,α',α"-tris(4-hyroxyphenyl)-1,3,5-triisopropylbenzene, phloroglucine, trimellitic acid, and isatin-bis(o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer such as a polyester-polycarbonate resin to be produced through polymerization of polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

The viscosity-average molecular weight of the polycarbonate resin to be used in the invention generally falls between 10,000 and 50,000, but preferably between 13,000 and 35,000, more preferably between 15,000 and 20,000. The viscosity of the resin in a methylene chloride solution at 20° C. is measured with an Ubbelohde's viscometer, and the intrinsic viscosity [η] thereof is derived from it. The viscosity-average molecular weight (Mv) of the resin is calculated according to the following equation:

$$[\eta]=1.23\times10^{-5}Mv^{0.83}.$$

(B) Thermoplastic Polyester:

Various types of thermoplastic polyesters are usable for the component (B) in the invention. For the component (B), specially preferred are polyester resins obtained through polycondensation of a difunctional carboxylic acid component and an alkylene glycol component. For the difunctional carboxylic acid component and the alkylene glycol component, mentioned are the following.

For the difunctional carboxylic acid component, mentioned are aromatic dicarboxylic acids including, for example, terephthalic acid, isophthalic acid and naphthalenedicarboxylic acid. Of those, preferred is terephthalic acid. Not interfering with the effect of the invention, the component may contain any other difunctional carboxylic acids, which are, for example, aliphatic carboxylic acids such as oxalic acid, malonic acid, adipic acid, suberic acid, azelaic acid, sebacic acid and decanedicarboxylic acid. In general, the proportion of the additional dicarboxylic acids is preferably at most 20 mol % of the total amount of the dicarboxylic acid component.

The alkylene glycol component is not specifically defined. For it, concretely, usable are aliphatic diols having from 2 to 10 carbon atoms, such as ethylene glycol, propylene-1,2-glycol, propylene-1,3-glycol, butylene-1,4-glycol, butylene-2,3-glycol, hexane-1,6-diol, octane-1,8-diol, neopentyl glycol and decane-1,10-diol. Of those, preferred are ethylene glycol and butylene glycols.

The thermoplastic polyester for the component (B) may be produced in any ordinary method of polycondensation in the presence or absence of a polycondensation catalyst that contains any of titanium, germanium and antimony. For example, polyethylene terephthalate is generally produced by esterifying terephthalic acid with ethylene glycol or transesterifying a lower alkyl ester such as dimethyl terephthalate with ethylene glycol to prepare a glycol terephthalate and/or its oligomer in the first stage reaction followed by further polymerizing the glycol ester and/or its oligomer into a polymer having an increased degree of polymerization in the second stage reaction.

The polycarbonate resin composition of the invention comprises a polycarbonate for the component (A) and a thermoplastic polyester for the component (B), in which the combination of the two components improves the melt flowability and the chemical resistance of the resin composition. The blend ratio of the component (A) to the component (B) in the resin mixture is such that the polycarbonate (A) accounts for from 1 to 99% by weight, preferably from 50 to 90% by weight of the mixture, and the thermoplastic polyester (B) accounts for from 1 to 99% by weight, preferably from 10 to 50% by weight thereof.

(C) Polyfluoro-olefin Resin:

The polycarbonate resin composition of the invention contains a polyfluoro-olefin resin which is for preventing the resin moldings from being melted to drip when fired. The polyfluoro-olefin resin is generally a polymer or copolymer having a fluoroethylene structure. For example, it includes difluoroethylene polymers, tetrafluoroethylene polymers, tetrafluoroethylene-hexafluoropropylene copolymers, and copolymers of tetrafluoroethylene and fluorine-free ethylenic monomers. Preferred foruse herein ispolytetrafluoroethylene (PTFE), and its mean molecular weight is preferably at least 500,000, more preferably from 500,000 to 10,000,000. Any and every type of polytetrafluoroethylene known in the art is usable in the invention.

Especially preferred for use herein is polytetrafluoroethylene having the ability to form fibrils, as it is more effective for preventing the resin melt from dripping. The fibril-forming polytetrafluoroethylene (PTFE) usable herein is not specifically defined. For example, PTFE of Type 3 that is grouped according to the ASTM Standard is used herein. Commercial products of such PTFE are available, including, for example, Teflon 6-J (from Mitsui-DuPont Fluorochemical), Polyflon D-1, Polyflon F-103 and Polyflon F-201 (all from Daikin Industry), and CD076 (from Asahi IC Fluoropolymers).

Except PTFE of Type 3 as above, others are also usable herein, including, for example, Argoflon 5 (from Montefluos), Polyflon MPA, Polyflon FA-100 (both from Daikin Industry), etc. One or more of these polytetrafluoroethylenes (PTFE) can be used either singly or as combined. The fibril-forming polytetrafluoroethylene (PTFE) such as those mentioned above can be obtained, for example, by polymerizing tetrafluoroethylene in an aqueous medium in the presence of sodium, potassium or ammonium peroxydisulfide therein, under a pressure of from 1 to 100 psi at a temperature falling between 0 and 200° C, preferably between 20 and 100° C.

The content of the component (C) in the resin composition falls between 0.01 and 3 parts by weight, preferably between 0.05 and 1 part by weight or between 0.05 and 2 parts by weight, relative to 100 parts by weight of the resin mixture of the components (A) and (B) therein. If it is too small, the dripping resistance of the resin composition will be not enough for the intended flame retardancy of the composition. However, even if its content is larger than the defined range, the polyfluoro-olefin resin added could no more augment its effect, and such a large amount of the polyfluoro-olefin resin, if added to the resin composition, will have some negative influences on the impact resistance and the outward appearance of the moldings of the composition. Therefore, the amount of the polyfluoro-olefin resin to be added to the resin composition may be suitably determined, depending on the necessary flame retardancy of the composition, for example, based on V-0, V-1 or V-2 in UL-94, and depending on the amount of the other constituent components.

The polycarbonate resin composition of the invention contains the component (D) and/or the component (E) in addition to the above-mentioned components (A) to (C).

(D) Polycarbonate-polyorganosiloxane Copolymer:

The polycarbonate-polyorganosiloxane copolymer (hereinafter referred to as PC-polyorganosiloxane copolymer) for the component (D) in the invention is a polymer comprising a polycarbonate moiety and a polyorganosiloxane moiety. The PC-polyorganosiloxane copolymer may be produced, for example, through interfacial polycondensation of a polycarbonate oligomer and a reactive group-terminated polyorganosiloxane (e.g., polydimethylsiloxane, polydiethylenesiloxane, polymethylphenylsiloxane, polydiphenylsiloxane) which are dissolved in a solvent such as methylene chloride with an aqueous solution of bisphenol A in sodium hydroxide added thereto, in the presence of a catalyst such as triethylamine.

Preferably, the degree of polymerization of the polycarbonate moiety of the PC-polyorganosiloxane copolymer falls between 3 and 100 or so. Also preferably, the degree of polymerization of the polyorganosiloxane moiety of the copolymer falls between 2 and 500 or so. The polyorganosiloxane content of the PC-polyorganosiloxane copolymer generally falls between 0.5 and 30% by weight, but preferably between 1 and 20% by weight. The viscosity-average molecular weight of the PC-polyorganosiloxane copolymer for the component (D) generally falls between 5,000 and 100,000, but preferably between 10,000 and 30,000. This may be measured in the same manner as that for the polycarbonate mentioned above.

The resin composition contains from 1 to 400 parts by weight, preferably from 5 to 330 parts by weight of the component (D), relative to 100 parts by weight of the resin mixture of the components (A) and (B) therein. If the amount of the component (D) in the resin composition not containing the component (E) is too small, the resin composition is not satisfactorily resistant to flames; but even if too large, the copolymer added could no more augment its effect.

In the polycarbonate resin composition comprising the components (A), (B), (C) and (D), the content of the component (D) preferably falls between 1 and 400 parts by weight, more preferably between 5 and 330 parts by weight. Also in the resin composition comprising the components (A), (B), (C), (D) and (E), the content of the component (D) preferably falls between 1 and 400 parts by weight, more preferably between 5 and 330 parts by weight.

(E) Functional Silicone Compound:

The functional silicone compound for the component (E) in the invention is a functional (poly)organosiloxane. Preferably, it is a polymer or copolymer having a basic structure of the following general formula (1):

$$R^1_a R^2_b SiO_{(4-a-b)/2} \quad (1)$$

wherein $R^1$ indicates a functional group, $R^2$ indicates a hydrocarbon residue having from 1 to 12 carbon atoms, and $0<a\leq3$, $0\leq b<3$, and $0<a+b\leq 3$.

The functional group for $R^1$ includes, for example, an alkoxy group, an aryloxy group, a polyoxyalkylene group, a hydrogen residue, a hydroxyl group, a carboxyl group, a silanol group, an amino group, a mercapto group, an epoxy group, and a vinyl group, of those, preferred are an alkoxy group, a hydrogen group, a vinyl group, and an epoxy group; and more preferred are a methoxy group and a vinyl group. Preferred examples of the hydrocarbon residue having from 1 to 12 carbon atoms for $R^2$ are a methyl group and a phenyl group. Preferred ranges of a, b and (a+b) are as follows: $0.2\leq a\leq 2.5$, $0\leq b\leq 2.5$, and $0.2\leq a+b\leq 3$.

The silicone compound for the component (E) may have a plurality of different functional groups; or a plurality of silicone compounds having different functional groups may be combined for the component (E).

In the basic structure of the functional silicone compound, the ratio of functional group ($R^1$)/hydrocarbon residue ($R^2$) generally falls between 0.1 and 3 or so, but preferably between 0.3 and 2 or so.

The functional silicone compound for the component (E) is liquid or powdery, but is preferably well dispersible in the other constituent components while they are kneaded in melt. One preferred example of the compound is liquid and has a viscosity at room temperature of from 10 to 500,000 cst or so. The polycarbonate resin composition containing the component (E) of the invention is characterized in that the component uniformly disperses therein even when it is liquid, and bleeds little out of the composition being molded and out of the moldings of the composition.

The resin composition may contain from 0.1 to 10 parts by weight, preferably from 0.2 to 5 parts by weight or from 2 to 5 parts by weight of the functional silicone compound, relative to 100 parts by weight of the resin mixture of the components (A) and (B) therein. If the content of the compound therein is smaller than 0.1 parts by weight, the resin composition, if not containing the component (D), could not be resistant to flames; but even if larger than 10 parts by weight, the compound could no more augment its effect.

In the polycarbonate resin composition comprising the components (A), (B), (C) and (E), the content of the component (E) preferably falls between 0.2 and 5 parts by weight, more preferably between 0.5 and 5 parts by weight. Also in the composition comprising the components (A), (B), (C), (D) and (E), the content of the component (E) preferably falls between 0.2 and 5 parts by weight, more preferably between 0.5 and 5 parts by weight.

The polycarbonate resin composition of the invention is preferably so controlled that the silicone content derived from the components (D) and/or the component (E) thereof falls between 0.5 and 10% by weight, more preferably between 0.7 and 5% by weight of the composition. If the silicone content is smaller than 0.5% by weight, the resin composition will be poorly resistant to flames; but if larger than 10% by weight, the impact resistance and the heat resistance of the composition will lower. The silicone content derived from the component (D) and/or the component (E) corresponds to the polyorganosiloxane content of the component (D) and/or the component (E).

(F) Inorganic Filler:

The resin composition comprising the components (A) to (C), and (D) and/or (E) attains the object of the invention. If desired, it may further contain an inorganic filler (F) which is for enhancing the stiffness and the flame retardancy of its moldings.

The inorganic filler includes, for example, talc, mica, kaolin, diatomaceous earth, calcium carbonate, calcium sulfate, barium sulfate, glass fibers, carbon fibers, and potassium titanate fibers. Especially preferred for use herein are tabular fillers of, for example, talc and mica, and fibrous fillers. Talc is a magnesium silicate hydrate, and its commercial products are preferably used herein. The inorganic tabular filler such as talc for use herein preferably has a mean particle size of from 0.1 to 50 μm, more preferably from 0.2 to 20 μm. The inorganic filler, especially talc, if in the resin composition, is effective for further enhancing the stiffness of the moldings of the composition, and, as the case may be, it will be able to reduce the amount of the silicone compound to be in the composition.

The content of the inorganic filler (F) in the resin composition may fall between 1 and 50 parts by weight, preferably between 2 and 30 parts by weight, relative to 100 parts by weight of the resin mixtures of the components (A) and (B) therein. If its amount is too small, the inorganic filler added could not satisfactorily exhibit its effect of enhancing the stiffness and the flame retardancy of the moldings of the composition; but if too large, the impact resistance of the moldings will lower and the melt fluidity of the composition will lower. The amount of the inorganic filler to be in the resin composition may be suitably determined, depending on the necessary properties of the moldings and the moldability of the composition, especially on the thickness of the moldings and the flowability of the composition.

In addition to the above-mentioned components, an elastomer may be added to the polycarbonate resin composition of the invention for further enhancing the impact resistance of the moldings of the composition. Preferred for that purpose is a core/shell-type elastomer. Preferably, the amount of the elastomer to be added falls between 0.5 and 10 parts by weight relative to 100 parts by weight of the resin mixture of the components (A) and (B) in the resin composition.

The polycarbonate resin composition of the invention may contain, in addition to the above-mentioned components, any additives that are generally added to ordinary thermoplastic resins, if desired. The additives include, for example, phenolic, phosphorus-containing or sulfur-containing antioxidants, antistatic agents, permanent antistatic agents such as polyamide-polyether block copolymers, benzotriazole-type or benzophenone-type UV absorbents, hindered amine-type light stabilizers (weather-proofing agents), plasticizers, microbicides, compatibilizers, and colorants (dyes, pigments). For their amount, the optional additives that may be in the polycarbonate resin composition of the invention are not specifically defined, provided that they do not interfere with the properties of the composition.

A method for producing the polycarbonate resin composition of the invention is described. The composition may be produced by mixing, melting and kneading the components (A) to (E) in the predetermined ratio as above, optionally along with the optional component such as (F) and additives as above in any desired ratio. Formulating and kneading the constituent components into the intended resin composition may be effected in any known manner, for example, by pre-mixing them in an ordinary device, such as a ribbon blender or a drum tumbler, followed by further kneading the resulting pre-mix in a Henschel mixer, a Banbury mixer, a single-screw extruder, a double-screw extruder, a multi-screw extruder, or a cokneader. The temperature at which the components are mixed and kneaded generally falls between 240 and 300° C. For molding the melt mixture, preferably used is an extrusion molding machine, more preferably a vented extruder. Other constituent components than the polycarbonate resin may be previously mixed to prepare a master batch, and it may be added to the polycarbonate resin.

Having been prepared by mixing and kneading the constituent components in the manner noted above, the polycarbonate resin composition of the invention may be pelletized, and the resulting pellets may be molded into various moldings through injection molding, injection compression molding, extrusion molding, blow molding, pressing, vacuum forming or foaming. The composition is especially favorable to injection molding or injection compression molding to give moldings. For injection molding of the composition, preferred is a gas-assisted molding method so as to improve the appearance of the moldings formed, especially to prevent sinking marks in the moldings and to reduce the weight of the moldings.

The polycarbonate resin composition of the invention satisfies the standard of UL94/V-0 (1.5 mm) or UL94/V-1 (1.5 mm), and its moldings are favorable to various housings and parts of electric and electronic appliances, such as duplicators, facsimiles, televisions, radios, tape recorders, video decks, personal computers, printers, telephones, information terminals, refrigerators, and microwave ovens. The moldings have still other applications, for example, for automobile parts.

The invention is described more concretely with reference to the following Examples and Comparative Examples, which, however, are not intended to restrict the scope of the invention.

EXAMPLES 1 to 5, AND COMPARATIVE EXAMPLES 1 to 4

The components shown in Table 1 were blended in the ratio indicated therein (all in terms of parts by weight), fed into a vented double-screw extruder (TEM35 from Toshiba Kikai), melted and kneaded therein at 280° C., and then pelletized. To all compositions of Examples and Comparative Examples, added were 0.2 parts by weight of Irganox 1076 (from Ciba Specialty Chemicals, octadecyl 3-(3,5-t-butyl-4-hydroxyphenyl)propionate) and 0.1 parts by weight of Adekastab C (from Asahi Denka Industry, diphenyl(2-ethylhexyl) phosphite) both serving as an antioxidant. The resulting pellets were dried at 120° C. for 12 hours, and then molded into test pieces in a mode of injection molding at 270° C. The mold temperature was 80° C. These test pieces were tested for their properties in various test methods, and their data obtained are given in Table 1.

The molding materials used and the test methods employed are mentioned below.
(A) Polycarbonate:
  PC-1: bisphenol A polycarbonate resin, Toughlon A1900 (from Idemitsu Petrochemical), having an MI of 20 g/10 min (at 300° C. under a load of 1.2 kg), and a viscosity-average molecular weight of 19,000.
(B) Thermoplastic Polyester:
  PET: polyethylene terephthalate, Dianite MA523 (from Mitsubishi Rayon).
  PBT: polybutylene terephthalate, Toughpet N1000 (from Mitsubishi Rayon).
(C) Polyfluoro-olefin Resin:
  PTFE: CD076 (from Asahi Fluoropolymers, having a mean molecular weight of 3,000,000).
(D) Polycarbonate-polyorganosiloxane Copolymer:
  PC-PDMS: bisphenol A polycarbonate-polydimethylsiloxane (PDMS) copolymer, having an MI of 45 g/10 min (at 300° C. under a load of 1.2 kg), a PDMS chain length (n) of 30, a PDMS content of 4% by weight, and a viscosity-average molecular weight of 20,000 (produced in Production Example 3-1 ($A_1$) in Japanese Patent Laid-Open No. 81260/1996).
(E) Functional Silicone Compound:
  Silicone-1: methylphenylsilicone with vinyl and methoxy groups, KR219 (from Shin-etsu Chemical Industry), having a viscosity of 18 cst (at 23° C.). This corresponds to formula (1) in which $R^1/R^2=0.67$, a=1 and b=1.5.
  Silicone-2: methoxy group-having dimethylsilicone, KC-89 (from Shin-etsu Chemical Industry), having a viscosity of 20 cst (at 23° C.). This corresponds to formula (1) in which $R^1/R^2=1.0$, a=1 and b=1.
  Silicone-3 (for comparison): dimethylsilicone, SH200 (from Toray Dow Corning), having a viscosity of 350 cst (at 23° C.)
(F) Inorganic Filler:
  Talc: FFR (from Asada Milling), having a mean particle size of 0.7 μm.
(G) Other Component:
  Elastomer: core/shell-type, grafted rubber-like elastomer, Metablen S2001 (from Mitsubishi Rayon).
[Test Methods]
(1) Melt Flowability:
  MI (melt index) of each sample is measured at 300° C. under a load of 1.2 kg, according to JIS K7210.
(2) IZOD Impact Strength:
  Measured according to ASTMD256. The temperature is 23° C., and the thickness of samples is ⅛ inches. The data are in terms of $kJ/m^2$.
(3) Flexural Modulus:
  Measured according to ASTM D-790. The temperature is 23° C., and the thickness of samples is 4 mm. The data are in terms of MPa.
(4) Grease Resistance:
  Measured according to a chemical resistance test method (for measuring the critical deflection of a test sample on a quarter oval tool).
  Concretely, a test sample (having a thickness of 3 mm) is fixed on a quarter oval tool as in FIG. 1 (showing a perspective view of the tool), Albanian grease (from Showa Shell Petroleum) is applied thereto, and this is kept as such for 48 hours. The shortest length (X) of the tool on which the sample has been cracked is read, and the critical deflection (%) of the sample is obtained according to the following equation.
  Critical Deflection (%)=$b/2a^2 \times [1-(1/a^2-b^2/a^4)X^2]^{-3/2}t$, in which t indicates the thickness of the test sample.
(5) Flame Retardancy:
  Tested according to the UL94 combustion test. Samples tested have a thickness of 1.5 mm.
(6) Thermal Stability in Dwell Time (300° C., 20 mm):
  The resin pellets are injection-molded into square plates in the same manner as above. In this process, the cylinder temperature in the injection-molding machine (Toshiba Kikai's 100EN) is kept flat (that is, the temperature in the cylinder is kept constant). The square plates thus molded have an outline size of 80 mm×80 mm and a thickness of 3.2 mm. Under the defined molding condition, the pellets are molded for 10 shots. After the necessary measurement, the resin melt is left in the cylinder for 20 minutes. Next, the resin pellets are injection-molded in the second run in the same manner as previously, and the first-shot samples are visually evaluated for their appearance.

In Table 1, "good" means that no visual difference in color was found between the first-shot samples in the second run and ordinary shot samples, and that the first-shot samples in the second run had no silver marks. "Silver" means that streaks (silver marks) were formed in the surface of the first-shot samples in the second run, owing to the gas generated during the second-run molding.

TABLE 1-1

|  |  |  | Example 1 | Comp. Ex. 1 | Comp. Ex. 2 |
|---|---|---|---|---|---|
| Blend Ratio | (A) | PC-1 | 85 | 85 | 100 |
|  | (B) | PET | 15 | 15 | — |
|  |  | PBT | — | — | — |
|  | (C) | PTFE | 0.5 | 0.5 | 0.5 |
|  | (D) | PC-PDMS | — | — | — |
|  | (E) | Silicone-1 | 4 | — | 4 |
|  |  | Silicone-2 | — | — | — |
|  |  | Silicone-3 | — | — | — |
|  | (F) | Talc | — | — | — |
|  | (G) | Elastomer | — | — | — |
|  |  | Total Silicone Content (wt. %) | 4.0 | 0 | 4.0 |
| Evaluation |  | (1) Melt Flowability: MI (g/10 min) | 35 | 33 | 22 |
|  |  | (2) IZOD Impact Strength (kJ/m$^2$) | 45 | 35 | 15 |
|  |  | (3) Flexural Modulus (MPa) | 2300 | 2300 | 2400 |
|  |  | (4) Grease Resistance (critical deflection) | 1.6≦ | 1.6≦ | 0.5 |
|  |  | (5) Flame Retardancy (1.5 mm) | V-0 | V-2 out | V-0 |
|  |  | (6) Thermal Stability in dwell time (appearance) | good | good | good |

TABLE 1-2

|  |  |  | Comp. Ex. 3 | Comp. Ex. 4 | Example 2 |
|---|---|---|---|---|---|
| Blend Ratio | (A) | PC-1 | 85 | 85 | 85 |
|  | (B) | PET | 15 | 15 | 15 |
|  |  | PBT | — | — | — |
|  | (C) | PTFE | — | 0.5 | 0.7 |
|  | (D) | PC-PDMS | — | — | 33 |
|  | (E) | Silicone-1 | 4 | — | 2.7 |
|  |  | Silicone-2 | — | — | — |
|  |  | Silicone-3 | — | 4 | — |
|  | (F) | Talc | — | — | — |
|  | (G) | Elastomer | — | — | — |
|  |  | Total Silicone Content (wt. %) | 4.0 | 4.0 | 3.0 |
| Evaluation |  | (1) Melt Flowability: MI (g/10 min) | 35 | 35 | 30 |
|  |  | (2) IZOD Impact Strength (kJ/m$^2$) | 45 | 40 | 55 |
|  |  | (3) Flexural Modulus (MPa) | 2300 | 2300 | 2300 |
|  |  | (4) Grease Resistance (critical deflection) | 1.6≦ | 1.6≦ | 1.2 |
|  |  | (5) Flame Retardancy (1.5 mm) | V-0 | V-2 out | V-0 |
|  |  | (6) Thermal Stability in dwell time (appearance) | good | good | good |

TABLE 1-3

|  |  |  | Ex. 3 | Ex. 4 | Ex. 5 | Comp. Ex. 5 |
|---|---|---|---|---|---|---|
| Blend Ratio | (A) | PC-1 | 60 | 60 | 60 | 85 |
|  | (B) | PET | 40 | 40 | — | 15 |
|  |  | PBT | — | — | 40 | — |
|  | (C) | PTFE | 2.0 | 1.2 | 0.6 | 0.5 |
|  | (D) | PC-PDMS | 300 | 300 | 100 | — |
|  | (E) | Silicone-1 | — | — | — | 0.3 |
|  |  | Silicone-2 | — | — | 4 | — |
|  |  | Silicone-3 | — | — | — | — |
|  | (F) | Talc | — | 40 | 20 | — |
|  | (G) | Elastomer | — | — | 10 | — |
|  |  | Potassium Perfluorobutane-sulfonate | — | — | — | 0.2 |
|  |  | Total Silicone Content (wt. %) | 3.0 | 2.7 | 3.5 | 0.3 |
| Evaluation |  | (1) Melt Flowability: MI (g/10 min) | 28 | 26 | 38 | 40 |
|  |  | (2) IZOD Impact Strength (kJ/m$^2$) | 60 | 15 | 40 | 15 |
|  |  | (3) Flexural Modulus (MPa) | 2400 | 3700 | 3400 | 2500 |
|  |  | (4) Grease Resistance (critical deflection) | 1.0 | 1.4 | 1.6≦ | 1.6≦ |
|  |  | (5) Flame Retardancy (1.5 mm) | V-1 | V-0 | V-0 | V-2 |
|  |  | (6) Thermal Stability in dwell time (appearance) | good | good | good | Silver |

Table 1 indicates the following.
(i) The flame retardancy of Comparative Example 1 containing neither the component (D) nor the component (E) is poor.
(ii) The melt flowability and the grease resistance of Comparative Example 2 not containing the component (B) are poor.
(iii) The flame retardancy of Comparative Example 3 not containing the component (C) is poor.
(iv) The flame retardancy of Comparative Example 4 containing an ordinary silicone compound is poor.
(v) The impact strength of Comparative Example 5 containing potassium perfluorobutanesulfonate is low, and the thermal stability in dwell time thereof is poor.

INDUSTRIAL APPLICABILITY

The polycarbonate resin composition of the invention contains neither halogen nor phosphorous, and is highly resistant to flames though containing a minor additive, and it has good impact resistance, high stiffness, good melt flowability and good chemical resistance. Therefore, the moldings of the polycarbonate resin composition of the invention are favorable for housing and parts of OA appliances, information appliances, and other electric and electronic appliances for household use and industrial use, and also for automobiles parts, etc.

What is claimed is:

1. A polycarbonate resin composition, comprising:
   a resin mixture of (A) and (B):
   (A) from 50 to 90% by weight of a polycarbonate, and
   (B) from 10 to 50% by weight of a thermoplastic polyester, relative to 100 parts by weight of said resin mixture of (A) and (B);
   (C) from 0.01 to 3 parts by weight of a polyfluoro-olefin resin, and a mixture of (D) and (E);
     wherein (D) is from 1 to 400 parts by weight of a polycarbonate-polyorganosiloxane copolymer;
     wherein (E) is from 0.1 to 10 parts by weight of a functional silicone compound, and wherein a silicone content derived from the component (D) and the component (E) falls between 0.5 and 10% by weight of said resin composition.

2. The polycarbonate resin composition as claimed in claim 1, further comprising (F) from 1 to 50 parts by weight of an inorganic filler.

3. The polycarbonate resin composition as claimed in claim 1, wherein the functional silicone compound for the component (E) has a basic structure of a general formula (1):

$$R^1_a R_2^b SiO_{(4-a-b)/2} \qquad (1)$$

wherein $R^1$ indicates a functional group, $R^2$ indicates a hydrocarbon residue having from 1 to 12 carbon atoms, and a and b are numbers satisfying the relations of $0 < a \leq 3$, $0 \leq b < 3$, and $0 < a+b \leq 3$.

4. The polycarbonate resin composition as claimed in claim 1, wherein a functional group in the functional silicone compound for the component (E) is at least one group selected from the group consisting of an alkoxy group, a vinyl group, a hydrogen residue and an epoxy group.

5. The polycarbonate resin composition as claimed in claim 1, wherein a functional group in the functional silicone compound for the component (E) is a methoxy group or a vinyl group.

6. The polycarbonate resin composition as claimed in claim 1, wherein the polyfluoro-olefin resin for the component (C) is a fibril-forming polytetrafluoroethilene having a mean molecular weight of at least 500,000.

7. The polycarbonate resin composition as claimed in claim 1, wherein the polyearbonate for the component (A) has a viscosity-average molecular weight of from 15,000 to 20,000.

8. The polycarbonate resin composition as claimed in claim 2, wherein the inorganic filler for the component (F) is talc having a mean particle size of from 0.2 to 20 μm.

9. Housings or parts of electric and electronic appliances, which comprise the polycarbonate resin composition of claim 1.

10. The polycarbonate resin composition as claimed in claim 3, wherein the inorganic filler for the component (F) is talc having a mean particle size of from 0.2 to 20 μm.

11. The polycarbonate resin composition as claimed in claim 4, wherein the inorganic filler for the component (F) is talc having a mean particle size of from 0.2 to 20 μm.

12. The polycarbonate resin composition as claimed in claim 5, wherein the inorganic filler for the component (F) is talc having a mean particle size of from 0.2 to 20 μm.

13. The polycarbonate resin composition as claimed in claim 6, wherein the inorganic filler for the component (F) is talc having a mean particle size of from 0.2 to 20 μm.

14. The polycarbonate resin composition as claimed in claim 7, wherein the inorganic filler for the component (F) is talc having a mean particle size of from 0.2 to 20 μm.

15. A molding obtained from the polycarbonate resin composition as claimed in claim 1.

16. The molding as claimed in claim 15, further comprising (F) from 1 to 50 parts by weight of an inorganic filler.

17. The molding as claimed in claim 15, wherein the functional silicone compound for the component (E) has a basic structure of a general formula (1):

$$R_1^a R_2^b SiO_{(4-a-b)/2} \qquad (1)$$

wherein $R^1$ indicates a functional group, $R^2$ indicates a hydrocarbon residue having from 1 to 12 carbon atoms, and a and b are numbers satisfying the relations of $0 < a \leq 3$, $0 \leq b < 3$, and $0 < a+b \leq 3$.

18. The molding as claimed in claim 15, wherein a functional group in the functional silicone compound for the component (E) is at least one group selected from the group consisting of an alkoxy group, a vinyl group, a hydrogen residue and an epoxy group.

19. The molding as claimed in claim 15, wherein the polyfluoro-olefin resin for the component (C) is a fibril-forming polytetrafluoroethylene having a mean molecular weight of at least 500,000.

20. The molding as claimed in claim 15, wherein the polycarbonate for the component (A) has a viscosity-average molecular w eight of from 15,000 to 20,000.

* * * * *